(12) United States Patent
Zhang et al.

(10) Patent No.: US 11,228,761 B2
(45) Date of Patent: Jan. 18, 2022

(54) BORDER HANDLING FOR EXTENDED QUADTREE PARTITIONS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/109,873

(22) Filed: Dec. 2, 2020

(65) Prior Publication Data
US 2021/0092377 A1 Mar. 25, 2021

Related U.S. Application Data

(63) Continuation of application No. PCT/IB2019/056971, filed on Aug. 19, 2019.

(30) Foreign Application Priority Data

Aug. 19, 2018 (WO) ................ PCT/CN2018/101222

(51) Int. Cl.
*H04N 19/119* (2014.01)
*H04N 19/96* (2014.01)
(Continued)

(52) U.S. Cl.
CPC ......... *H04N 19/119* (2014.11); *H04N 19/176* (2014.11); *H04N 19/1883* (2014.11); *H04N 19/96* (2014.11); *H04N 19/46* (2014.11)

(58) Field of Classification Search
CPC ............... H04N 19/119; H04N 19/176; H04N 19/1883; H04N 19/96; H04N 19/46
(Continued)

(56) References Cited

U.S. PATENT DOCUMENTS

| | | | | |
|---|---|---|---|---|
| 2014/0294084 | A1* | 10/2014 | Cheon | H04N 19/14 375/240.16 |
| 2015/0312588 | A1* | 10/2015 | Yamamoto | H04N 19/577 375/240.15 |
| 2019/0313129 | A1* | 10/2019 | Lee | H04N 19/176 |

FOREIGN PATENT DOCUMENTS

| | | |
|---|---|---|
| EP | 3059708 A1 | 8/2016 |
| WO | 2016091161 A1 | 6/2016 |
| WO | 2018088805 A1 | 5/2018 |

OTHER PUBLICATIONS

Bross, Benjamin. "Versatile Video Coding (Draft 1)" Joint Video Experts Team (JVET) of ITU-T SG 16 WP 3 and ISO/IEC JTC 1/SC 29/WG 11, 10th Meeting: San Diego, US, Apr. 10-20, 2018, Document JVET-J1001, 2018.
(Continued)

*Primary Examiner* — Matthew K Kwan
(74) *Attorney, Agent, or Firm* — Perkins Coie LLP

(57) ABSTRACT

A method for video bitstream processing, comprising: determining that a first portion of a data unit of the video bitstream exceeds beyond one or multiple borders of a second portion of the data unit of the video bitstream; and performing at least one of: extended quad tree (EQT) partitioning, flexible tree (FT) partitioning, or generalized triple tree (GTT) partitioning of the first portion of the data unit based on the determination that the first portion exceeds beyond the border.

14 Claims, 19 Drawing Sheets

(51) Int. Cl.
*H04N 19/169* (2014.01)
*H04N 19/176* (2014.01)
*H04N 19/46* (2014.01)

(58) Field of Classification Search
USPC .................................................. 375/240.02
See application file for complete search history.

(56) References Cited

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Gao et al. "CE1-2.0.11: Picture Boundary Handling," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0287, 2018.

H.265/HEVC, https://www.itu.int/rec/T-REC-H.265.

JEM-7.0: https://jvet.hhi.fraunhofer.de/svn/svn_HMJEMSoftware/tags/ HM-16.6-JEM-7.0.

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117r1, 2016.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Ma et al. Description of Core Experiment 1 (CE 1): Partitioning, Joint Video Exploration Team (JVET) of ITU-T SG 16 WP 3 and ISO/IEC JTC 1/SC 29/WG 11, 10th Meeting: San Diego, US, Apr. 10-20, 2018, document JVET-J1021, 2018.

Sullivan et al. "Overview of the High Efficiency Video Coding (HEVC) Standard," IEEE Transactions on Circuits and Systems for Video Technology, Dec. 2012, 22(12):1649-1668.

International Search Report and Written Opinion from International Patent Application No. PCT/IB2019/056968 dated Nov. 27, 2019 (17 pages).

International Search Report and Written Opinion from International Patent Application No. PCT/IB2019/056971 dated Nov. 27, 2019 (17 pages).

* cited by examiner

BORDER HANDLING FOR EXTENDED QUADTREE PARTITIONS

CROSS-REFERENCE TO RELATED APPLICATION

This application is a continuation of International Application No. PCT/IB2019/056971, filed on Aug. 19, 2019, which claims the priority to and benefits of International Patent Application No. PCT/CN2018/101222, filed on Aug. 19, 2018. All the aforementioned patent applications are hereby incorporated by reference in their entireties.

TECHNICAL FIELD

This document is related to video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments for in which partitioning is improved at borders.

In one example aspect, a method of video bitstream processing is disclosed. The method includes determining that a first portion of an image exceeds beyond a border of a second portion of the image, and performing at least one of: extended quad tree (EQT) partitioning, flexible tree (FT) partitioning, or generalized triple tree (GTT) partitioning of the first portion of the image based on the determination that the first portion exceeds beyond the border.

In another example aspect, a method of video bitstream processing includes determining that a first portion of an image exceeds beyond a border of a second portion of the image, and partitioning the first portion of the image using a partitioning technique to encode the first portion based on the determination that the first portion exceeds beyond the border, the partitioning technique excluding: extended quad tree (EQT) partitioning, flexible tree (FT) partitioning, and generalized triple tree (GTT) partitioning.

In another aspect, a method of video bitstream processing includes determining characteristics regarding how a first portion of an image exceeds beyond a border of a second portion of the image, and performing at least one of: extended quad tree (EQT) partitioning, flexible tree (FT) partitioning, or generalized triple tree (GTT) partitioning with the first portion of the image to encode the first portion based on the characteristics of how the first portion of the image exceeds beyond the border.

In another example aspect, a method for video bitstream processing, comprising: determining that a first portion of a data unit of the video bitstream exceeds beyond one or multiple borders of a second portion of the data unit of the video bitstream; and performing at least one of: extended quad tree (EQT) partitioning, flexible tree (FT) partitioning, or generalized triple tree (GTT) partitioning of the first portion of the data unit based on the determination that the first portion exceeds beyond the border.

In another example aspect, a method for video bitstream processing, comprising: determining that a first portion of a data unit of the video bitstream exceeds beyond one or multiple borders of a second portion of the data unit of the video bitstream; and partitioning the first portion of the data unit using a partitioning technique based on the determination that the first portion exceeds beyond the border, the partitioning technique excluding at least one of extended quad tree (EQT) partitioning, flexible tree (FT) partitioning, and generalized triple tree (GTT) partitioning.

In another example aspect, a method for video bitstream processing, comprising: determining characteristics regarding how a first portion of a data unit of the video bitstream exceeds beyond one or multiple borders of a second portion of the data unit of the video bitstream; and performing at least one of: extended quad tree (EQT) partitioning, flexible tree (FT) partitioning, or generalized triple tree (GTT) partitioning with the first portion of the data unit based on the characteristics of how the first portion of the image exceeds beyond the border.

In another example aspect, a method for video bitstream processing, comprising:
determining that a first portion of a data unit of the video bitstream exceeds beyond a border of a second portion of the data unit of the video bitstream; and performing at least one of: extended quad tree (EQT) partitioning, flexible tree (FT) partitioning, or generalized triple tree (GTT) partitioning of the first portion of the data unit as forced boundary partitioning (FBP) based on the determination that the first portion exceeds beyond the border.

In another example aspect, the above-described method may be implemented by a video decoder apparatus that comprises a processor.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This invention is related to image/video coding, especially on the partition structure, i.e., how to split one Coding Tree Unit (CTU) into Multiple Coding Units (CUs) at picture/slice borders. It may be applied to the existing video coding standard like HEVC, or the standard (Versatile Video Coding) to be finalized. It may be also applicable to future video coding standards or video codec.

2. Background

Figure 11:
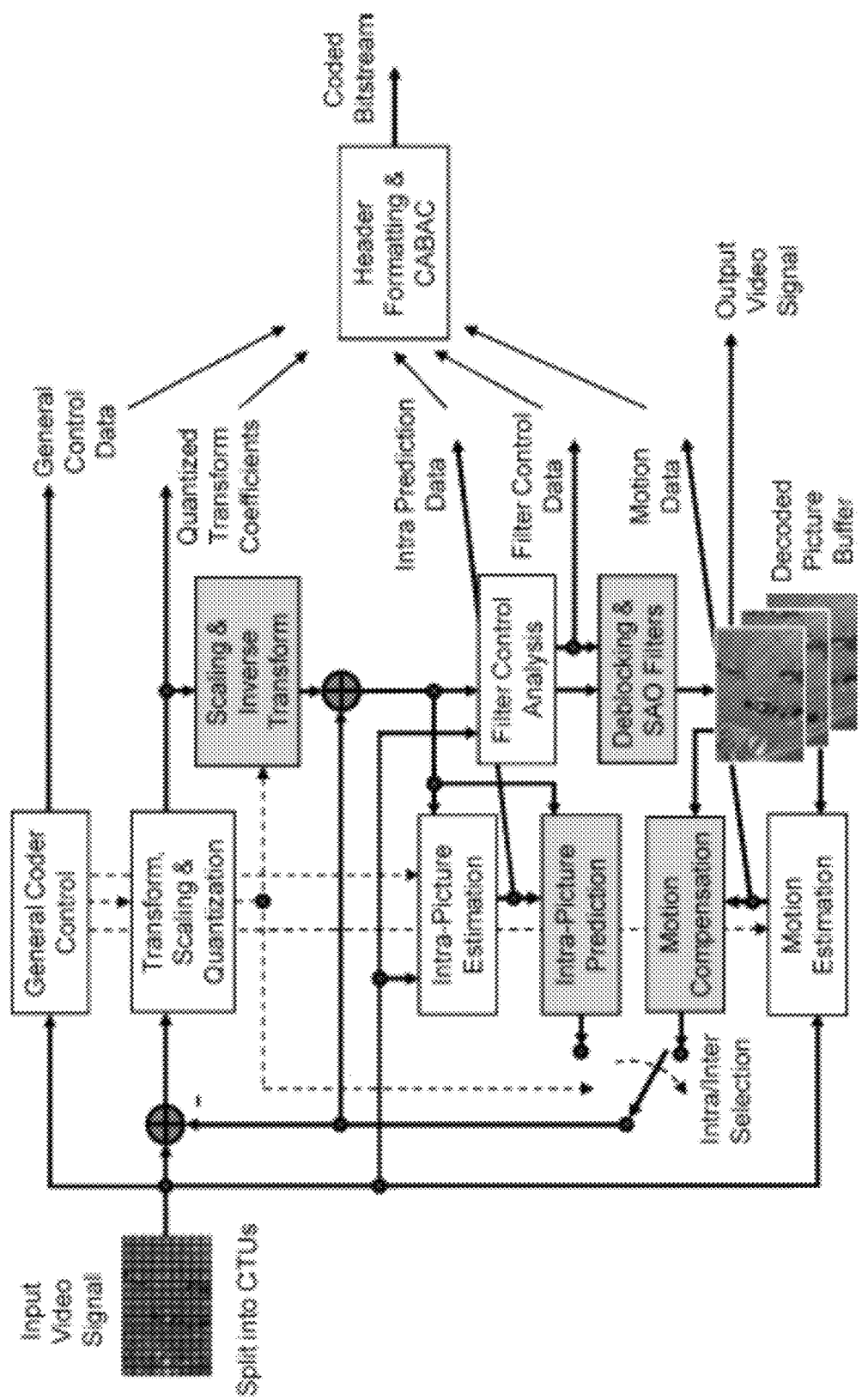
FIG. 11 shows a block diagram of an example implementation of a video encoder.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. FIG. 11 is a block diagram of an example implementation of a video encoder.

2.1 Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 5). Only one motion vector (MV) per sub-macroblock partition is allowed.

Figure 1:
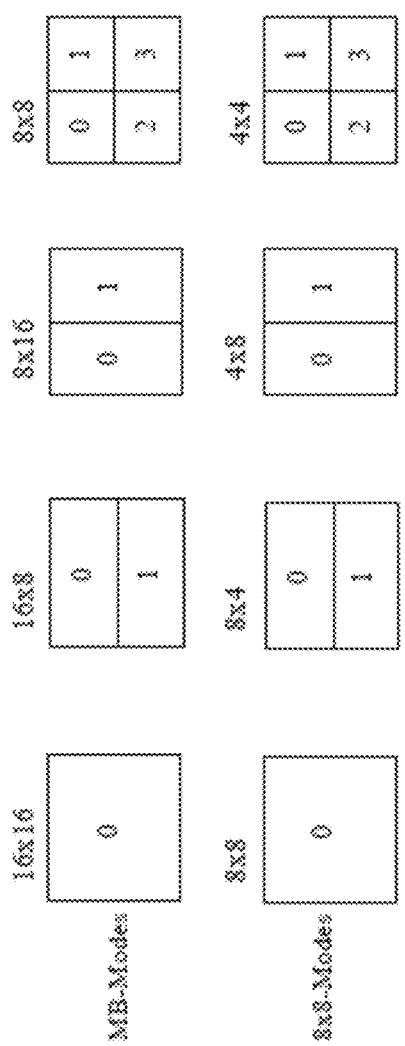
FIG. 1 is an illustration of MB partitions in H.264/Advanced Video Coding (AVC).

FIG. 1 is an illustration of MB partitions in H.264/Advanced Video Coding (AVC).

2.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples.

Figure 2:
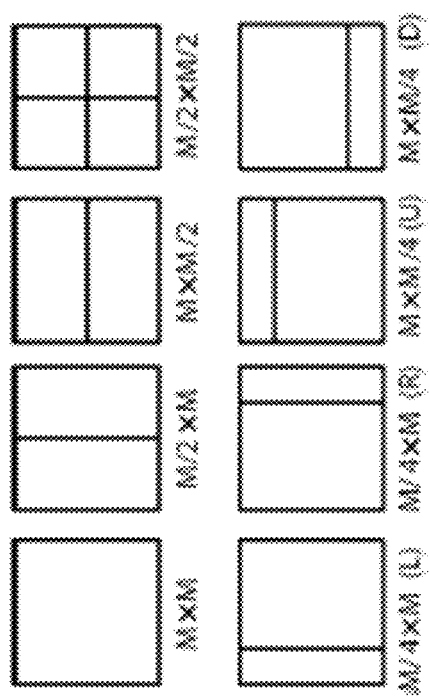
FIG. 2 shows examples of modes for splitting a coding block (CB) into prediction blocks (PBs).

FIG. 2 shows examples of modes for splitting a coding block (CB) into prediction blocks (PBs).

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

Figure 3:
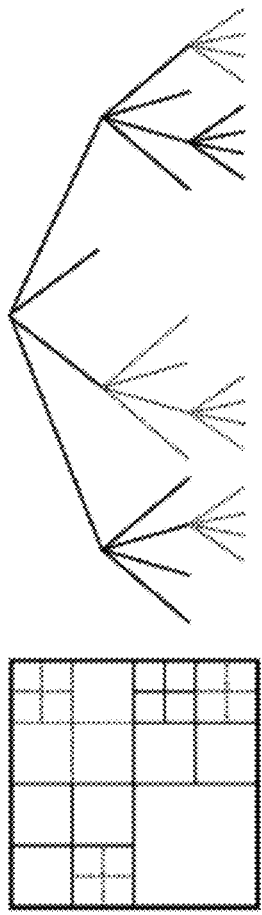
FIG. 3 shows an example of subdivision of a coding tree block (CTB) into CBs.

FIG. 3 shows an example of subdivision of a coding tree block (CTB) into CBs.

2.3 Quadtree Plus Binary Tree Block Structure With Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.3.1 QTBT Block Partitioning Structure

Figure 5:
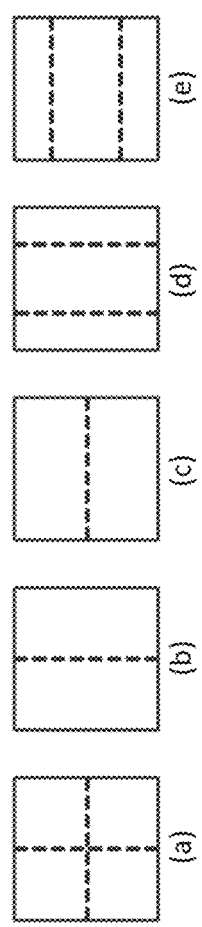
FIG. 5 shows examples of partitioning.

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC.
MinQTSize: the minimum allowed quadtree leaf node size.
MaxBTSize: the maximum allowed binary tree root node size.
MaxBTDepth: the maximum allowed binary tree depth.
MinBTSize: the minimum allowed binary tree leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 4:
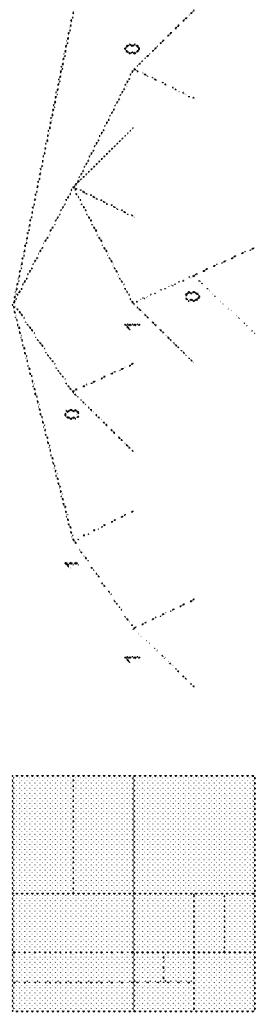
FIG. 4 shows an example of a quadtree plus binary tree (QTBT) structure.

FIG. 4 (left) illustrates an example of block partitioning by using QTBT, and FIG. 4 (right) illustrates the corresponding tree representation. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.4 Triple-Tree for VVC

As proposed in JVET-D0117, tree types other than quad-tree and binary-tree are supported. In the implementation, two more triple tree (TT) partitions, i.e., horizontal and vertical center-side triple-trees are introduced, as shown in FIG. 5 at (d) and (e).

In JVET-D0117, there are two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.5 Extended Quad Tree in PCT/CN2018/089918

A extended quad tree (EQT) partitioning structure corresponding to a block partitioning process including an extended quad tree partitioning process for the block of video data, wherein the extended quad partitioning structure represents partitioning the block of video data into final sub-blocks, and when the extended quad tree partitioning process decides to apply extended quad tree partition to one given block, said one given block is always split into four sub-blocks; decoding the final sub-blocks based on the video bitstream; and decoding the block of video data based on the final sub-blocks decoded according to the EQT structure derived. EQT is presented in PCT/CN2018/089918.

The EQT partitioning process can be applied to a given block recursively to generate EQT leaf nodes. Alternatively, when EQT is applied to a certain block, for each of the sub-block due to EQT, it may further be split into BT and/or QT and/or TT and/or EQT and/or other kinds of partition trees.

In one example, EQT and QT may share the same depth increment process and same restrictions of leaf node sizes. In this case, the partitioning of one node could be implicitly terminated when the size of the node reaches a minimum allowed quad tree leaf node size or EQT depth with the node reaches a maximum allowed quad tree depth.

Alternatively, EQT and QT may share different depth increment process and/or restrictions of leaf node sizes. The partitioning of one node by EQT is implicitly terminated when the size of the node reaches a minimum allowed EQT leaf node size or EQT depth associated with the node reaches a maximum allowed EQT depth. In one example, furthermore, the EQT depth and/or the minimum allowed EQT leaf node sizes may be signaled in sequences parameter set (SPS), and/or picture parameter set (PPS), and/or slice header, and/or CTU, and/or regions, and/or tiles, and/or CUs.

Instead of using the current quad tree partition applied to a square block, for a block with M×N (M and N are non-zero positive integer values, either equal or unequal) size, in EQT, one block may be split equally into four partitions, such as M/4×N or M×N/4 (examples are depicted in FIGS. 6 (a) and (b)) or split equally into four partitions and the partition size is dependent on the maximum and minimum values of M and N. In one example, one 4×32 block may be split into four 4×8 sub-blocks while a 32×4 block may be split into four 8×4 sub-blocks.

Instead of using the current quad tree partition applied to a square block, for a block with M×N (M and N are non-zero positive integer values, either equal or unequal) size, in EQT, one block may be split unequally into four partitions, such as two partitions are with size equal to (M*w0/w)×(N*h0/h) and the other two are with (M*(w−w0)/w)×(N*(h−h0)/h).

For example, w0 and w may be equal to 1 and 2, respectively that is the width is reduced by half while the height could use other ratios instead of 2:1 to get the sub-blocks. Examples for this case are depicted in FIGS. 6 (c) and (e). Alternatively, h0 and h may be equal to 1 and 2, respectively, that is the height is reduced by half while the width could use other ratios instead of 2:1. Examples for this case are depicted in FIGS. 6 (d) and (f).

FIGS. 6 (g) and (h) show two alternative examples of quad tree partitioning.

Figure 6C:
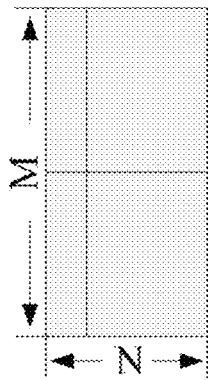
FIGS. 6A-K show examples of extended quad tree (EQT) partitioning.
Figure 6F:
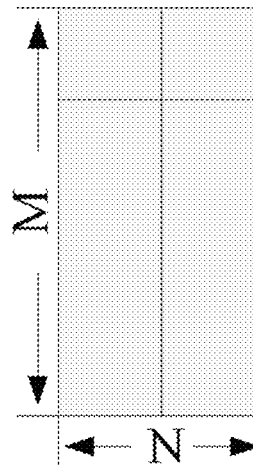
Figure 6B:
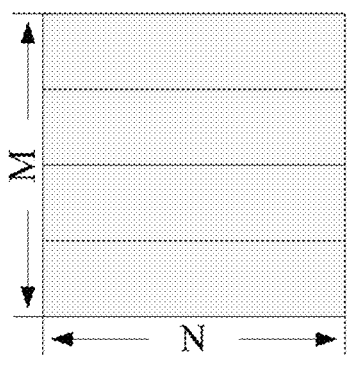
Figure 6E:
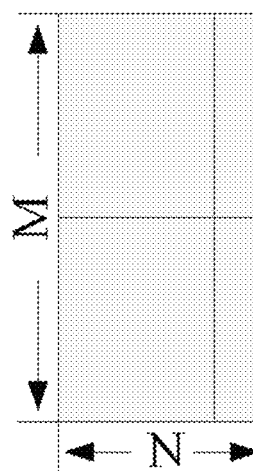
Figure 6A:
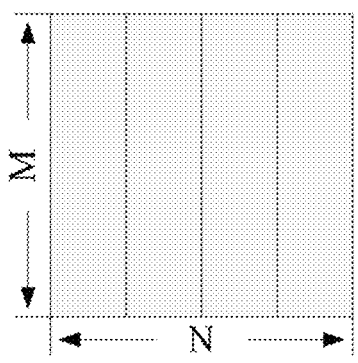

FIGS. 6 (i) shows a more general case of quad tree partitioning with different shapes of partitions FIGS. 6 (j) and (k) show general examples of FIGS. 6(a) and (b).

FIG. 6 (a) shows M×N/4.

FIG. 6 (b) shows M/4×N.

FIG. 6 (c) shows sub-block width fixed to be M/2, height equal to N/4 or 3N/4, smaller for top two partitions.

FIG. 6 (d) shows sub-block height fixed to be N/2, width equal to M/4 or 3M/4, smaller for left two partitions.

FIG. 6 (e) shows sub-block width fixed to be M/2, height equal to 3N/4 or N/4, smaller for bottom two partitions.

FIG. 6 (f) shows sub-block height fixed to be N/2, width equal to 3M/4 or M/4, smaller for right two partitions.

FIG. 6 (g) shows M×N/4 and M/2×N/2.

FIG. 6 (h) shows N×M/4 and N/2×M/2.

FIG. 6 (i) shows M1×N1, (M−M1)×N1, M1×(N−N1) and (M−M1)×(N−N1).

FIG. 6 (j) shows M×N1, M×N2, M×N3 and M×N4, where N1+N2+N3+N4=N.

FIG. 6 (k) shows M1×N, M2×N, M3×N and M4×N where M1+M2+M3+M4=M.

A flexible tree (FT) partitioning structure corresponding to a block partitioning process including an FT partitioning process for the block of video data, wherein the FT partitioning structure represents partitioning the block of video data into final sub-blocks, and when FT partitioning process decides to apply FT partition to one given block, said one given block is split into K sub-blocks wherein K could be larger than 4; decoding the final sub-blocks based on the video bitstream; and decoding the block of video data based on the final sub-blocks decoded according to the FT structure derived.

The FT partitioning process can be applied to a given block recursively to generate FT tree leaf nodes. The partitioning of one node is implicitly terminated when the node reaches a minimum allowed FT leaf node size or FT depth associated with the node reaches a maximum allowed FT depth.

Alternatively, when FT is applied to a certain block, for each of the sub-block due to FT, it may further be split into BT, and/or QT, and/or EQT, and/or TT, and/or other kinds of partition trees.

Alternatively, furthermore, the FT depth or the minimum allowed FT leaf node sizes or the minimum allowed partition size for FT may be signaled in sequences parameter set (SPS), and/or picture parameter set (PPS), and/or slice header, and/or CTU, and/or regions, and/or tiles, and/or CUs.

Similarly to the proposed EQT, all of the sub-blocks due to FT partitions may be with the same size; alternatively, the sizes of different sub-blocks may be different.

In one example, K is equal to 6 or 8. Some examples are depicted in FIG. 7.

FIG. 7 (a) shows K=8, M/4*N/2.

FIG. 7 (b) shows K=8, M/2*N/4.

FIG. 7 (c) shows K=6, M/2*N/2 and M/4*N/2.

FIG. 7 (d) shows K=6, M/2*N/2 and M/2*N/4.

For the TT, the restriction of splitting along either horizonal or vertical may be removed.

Figure 8:
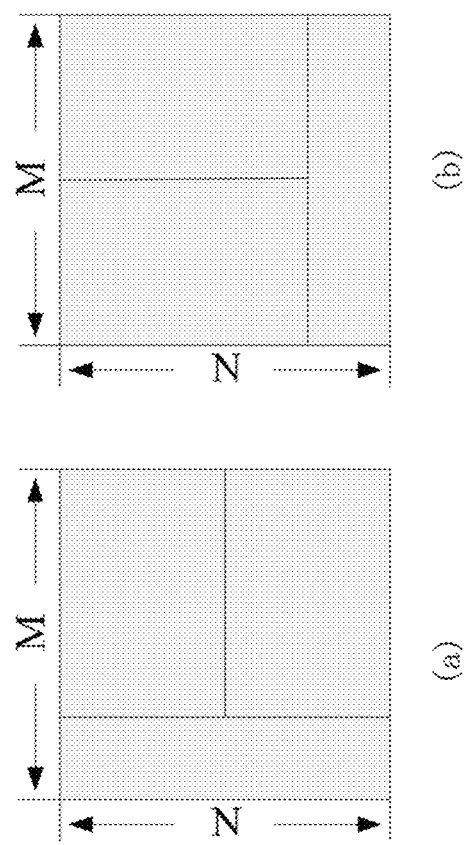
FIG. 8 shows examples of generalized triple tree (GTT) partitioning.

In one example, a generalized TT (GTT) partition pattern may be defined as splitting for both horizontal and vertical. An example is shown in FIG. 8.

The proposed methods may be applied under certain conditions. In other words, when the condition(s) are not satisfied, there is no need to signal the partition types.

Alternatively, the proposed methods may be used to replace the existing partition tree types. Alternatively, furthermore, the proposed methods may be only used as a replacement under certain conditions.

In one example, the condition may include the picture and/or slice types; and/or block sizes; and/or the coded modes; and/or whether one block is located at picture/slice/tile boundary.

In one example, the proposed EQT may be treated in the same way as QT. In this case, when it is indicated that the partition tree type is QT, more flags/indications of the detailed quad-tree partition patterns may be further signaled. Alternatively, EQT may be treated as additional partition patterns.

In one example, the signaling of partitioning methods of EQT or FT or GTT may be conditional, i.e. one or some EQT/FT/GTT partitioning methods may not be used in some cases, and the bits corresponding to signal these partitioning methods are not signaled.

2.6 Border Handling in JVET-K0287

In JVET-K0287, a boundary handling method is proposed to Versatile Video Coding (VVC). A similar method is also adopted into AVS-3.0.

Figure 9:
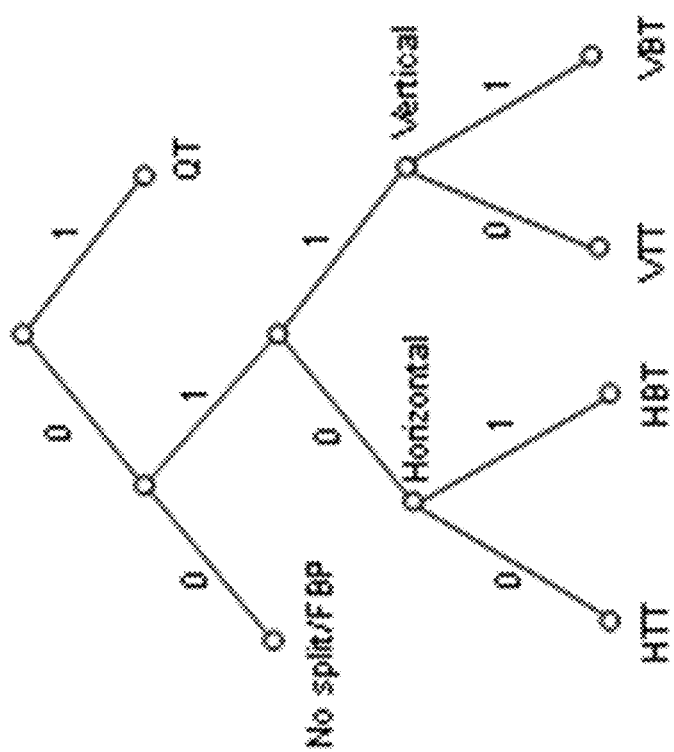
FIG. 9 shows an example of versatile boundary partitioning.

Since the forced quadtree boundary partition solution in VVC is not optimized. JVET-K0287 proposed the boundary partition method using regular block partition syntax to keep the continuity CABAC engine as well as matching the picture boundary The versatile boundary partition obtains the following rules (both encoder and decoder):

Using exactly same partition syntax of the normal block (non-boundary) (for instance, VTM-1.0 like FIG. 9) for boundary located block, the syntax need to be unchanged.

If the no split mode is parsed for the boundary CU, used forced boundary partition (FBP) to match the picture boundary.

After forced boundary partition (non-singling boundary partition), no further partition.

The forced boundary partition is descripted as follow:

If the size of block is larger than the maximal allowed BT size, forced QT is used to perform the FBP in the current forced partition level;

Otherwise, if the bottom-right sample of current CU is located below the bottom picture boundary, and not exceeding the right boundary, forced horizontal BT is used to perform the FBP in the current forced partition level;

Otherwise, if the bottom-right sample of current CU is located at the right side of the right picture boundary, and not below the bottom boundary, forced vertical BT is used to perform the FBP in the current forced partition level;

Otherwise, if the bottom-right sample of current CU is located at the right side of the right picture boundary and below the bottom boundary, forced QT is used to perform the FBP in the current forced partition level.

3. Examples of Problems Solved by Embodiments

EQT proposed in PCT/CN2018/089918, which is incorporated herein by reference in its entirety, does not consider the cases when a CTU/CU cross the border of a picture/slice/tile.

In JVET-K0287, only QT and BT are considered, EQT is not under consideration.

4. Examples of Embodiments

To address the problem, several methods are proposed to handle the cases for EQT when a CTU/CU cross the border of a picture/slice/tile or other kinds of units containing multiple CTUs/CUs.

The detailed inventions below should be considered as examples to explain general concepts. These embodiments should not be interpreted in a narrow way. Furthermore, these embodiments can be combined in any manner.

In one embodiment, the CTU/CU crossing a border can be split by EQT, FT, or GTT. The signaling process for EQT, FT, or GTT is the same when a CTU/CU crosses a border or not.

In one embodiment, the CTU/CU crossing a border cannot be split by EQT, FT, or GTT. The signaling process for EQT, FT, or GTT is the different when a CTU/CU crosses a border or not.
  a) In one example, if a CTU/CU is located at borders, indications of usage of EQT, FT, or GTT are not signaled.

Figure 6D:
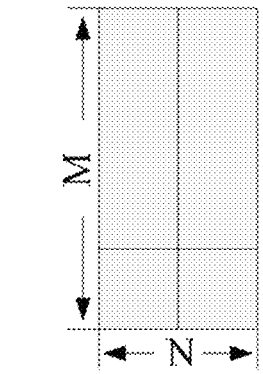
Figure 6G:
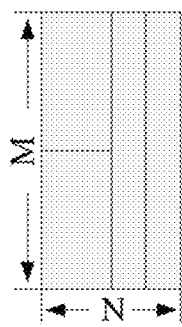
Figure 6G:
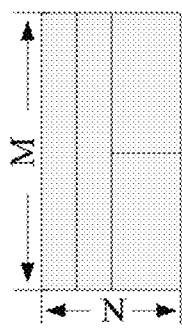
Figure 6G:
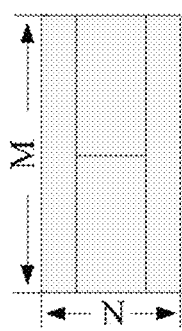
Figure 6H:
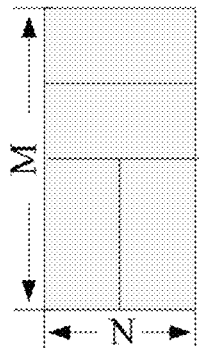
Figure 6H:
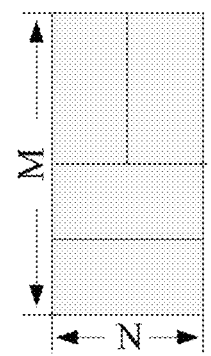
Figure 6H:
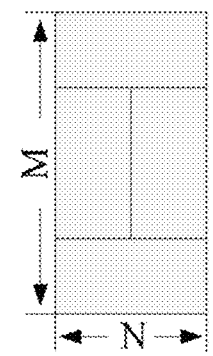
Figure 6K:
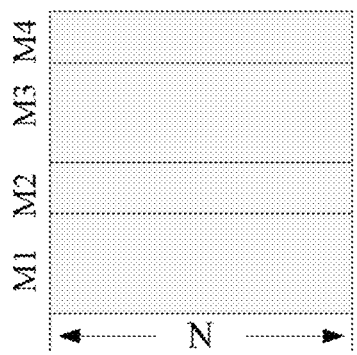
Figure 6J:
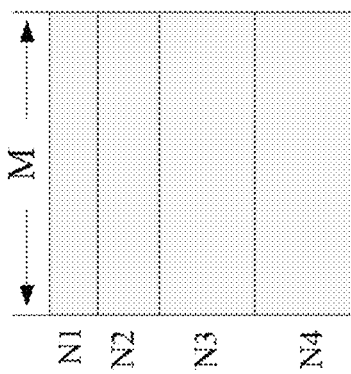
Figure 6I:
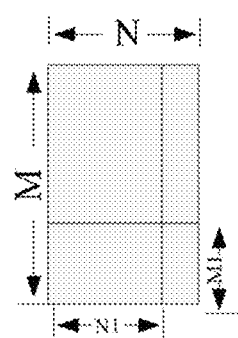

In one embodiment, whether to signal indications of usage of EQT, FT, or GTT may depend on how the CTU/CU crosses borders.
  a) In one example, if the bottom-right sample of current CU is located below the bottom picture boundary, and not exceeding the right boundary, or if the bottom-right sample of current CU is located at the right side of the right picture boundary, and not below the bottom boundary, indications of usage of EQT, FT, or GTT may be signaled.
  b) In one example, if the bottom-right sample of current CU is located at the right side of the right picture boundary and below the bottom boundary, indications of usage of EQT, FT, or GTT may not be signaled In one embodiment, EQT can be treated as the Forced Boundary Partition (FBP) in the method proposed in JVET-K0287.
  a) In one example, the partition in FIG. 6(a) is treated as the FBP.
  b) In one example, the partition in FIG. 6(b) is treated as the FBP.
  c) In one example, the partition in FIG. 6(c) is treated as the FBP.
  d) In one example, the partition in FIG. 6(d) is treated as the FBP.
  e) In one example, the partition in FIG. 6(e) is treated as the FBP.
  f) In one example, the partition in FIG. 6(f) is treated as the FBP.
  g) In one example, the partition in FIG. 6(g) is treated as the FBP.
  h) In one example, the partition in FIG. 6(h) is treated as the FBP.
  i) In one example, the partition in FIG. 6(i) is treated as the FBP.
  j) In one example, the partition in FIG. 6(j) is treated as the FBP.
  k) In one example, the partition in FIG. 6(k) is treated as the FBP.

Figure 7B:
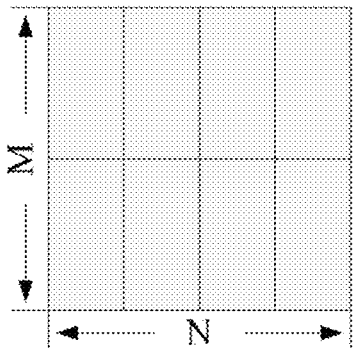
FIGS. 7A-D show examples of flexible tree (FT) partitioning.
Figure 7D:
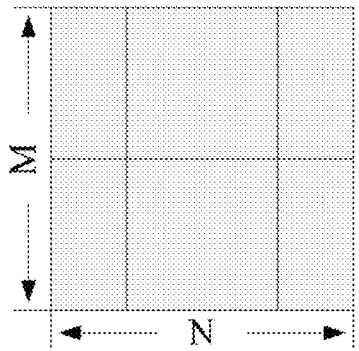
Figure 7A:
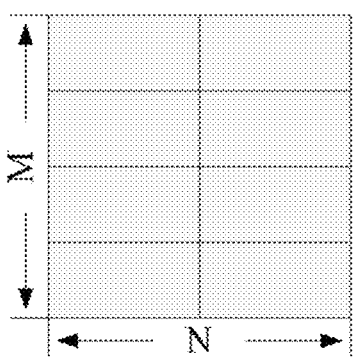
Figure 7C:
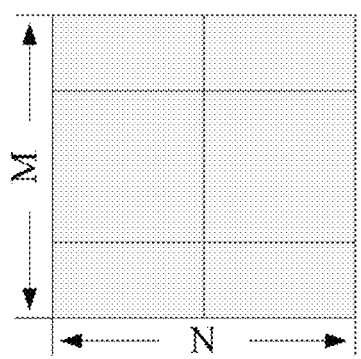

In one embodiment, FT can be treated as the Forced Boundary Partition (FBP) in the method proposed in JVET-K0287.
  a) In one example, the partition in FIG. 7(a) is treated as the FBP.
  b) In one example, the partition in FIG. 7(b) is treated as the FBP.
  c) In one example, the partition in FIG. 7(c) is treated as the FBP.
  d) In one example, the partition in FIG. 7(d) is treated as the FBP.

In one embodiment, GTT can be treated as the Forced Boundary Partition (FBP) in the method proposed in JVET-K0287.
  a) In one example, the partition in FIG. 8(a) is treated as the FBP.
  b) In one example, the partition in FIG. 8(b) is treated as the FBP.
  c) In one example, the partition in FIG. 8(c) is treated as the FBP.

Figure 10:
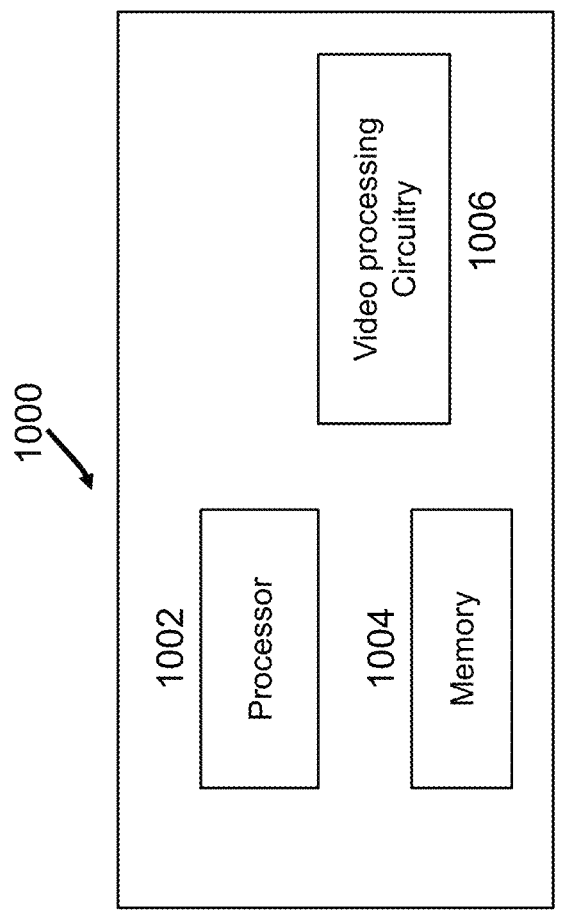
FIG. 10 is a block diagram of an example of a video processing apparatus.

In one example, whether to and how to set EQT as the FBP depends on how the CTU/CU crosses the border.
  a) In one example, if the bottom-right sample of current CU is located below the bottom picture boundary, and not exceeding the right boundary, FIG. 6(a) or FIG. 6(g) or FIG. 6(j) is used to perform the FBP in the current forced partition level;
  b) In one example, if the bottom-right sample of current CU is located at the right side of the right picture boundary, and not below the bottom boundary, FIG. 6(b) or FIG. 6(h) or FIG. 6(k) is used to perform the FBP in the current forced partition level;
  c) In one example, if the bottom-right sample of current CU is located at the right side of the right picture boundary and below the bottom boundary, FIG. 6(c) or FIG. 6(d) or FIG. 6(e) or FIG. 6(f) or FIG. 6(i) is used to perform the FBP in the current forced partition level;

In one example, whether to and how to set FT as the FBP depends on how the CTU/CU crosses the border.
  a) In one example, if the bottom-right sample of current CU is located below the bottom picture boundary, and not exceeding the right boundary, FIG. 7(b) or FIG. 7(d) is used to perform the FBP in the current forced partition level;
  b) In one example, if the bottom-right sample of current CU is located at the right side of the right picture boundary, and not below the bottom boundary, FIG. 7(a) or FIG. 7(c) is used to perform the FBP in the current forced partition level;

In one example, whether to and how to set GTT as the FBP depends on how the CTU/CU crosses the border.
  a) In one example, if the bottom-right sample of current CU is located below the bottom picture boundary, and not exceeding the right boundary, FIG. 8(b) is used to perform the FBP in the current forced partition level;
  b) In one example, if the bottom-right sample of current CU is located at the right side of the right picture boundary, and not below the bottom boundary, FIG. 8(a) is used to perform the FBP in the current forced partition level;

FIG. 10 is a block diagram of a video processing apparatus 1000. The apparatus 1000 may be used to implement one or more of the methods described herein. The apparatus 1000 may be embodied in a smartphone, tablet, computer, Internet of Things (IoT) receiver, and so on. The apparatus 1000 may include one or more processors 1002, one or more memories 1004 and video processing hardware 1006. The processor(s) 1002 may be configured to implement one or more methods described in the present document. The memory (memories) 1004 may be used for storing data and code used for implementing the methods and techniques described herein. The video processing hardware 1006 may be used to implement, in hardware circuitry, some techniques described in the present document.

Figure 12:
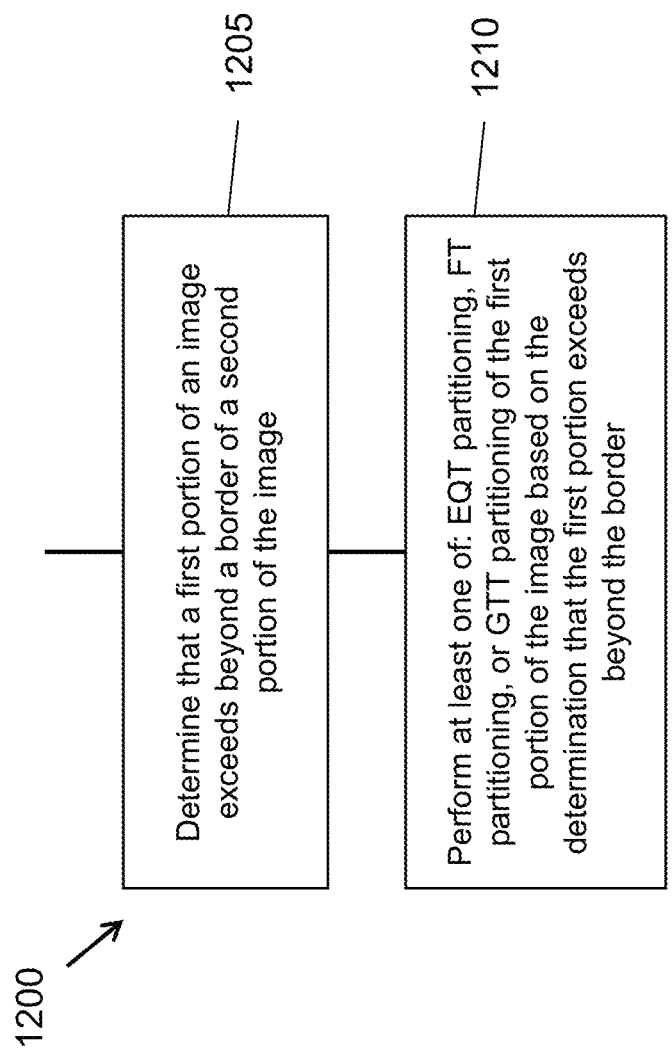
FIG. 12 is a flowchart for an example of a video bitstream processing method.

FIG. 12 is a flowchart for a method 1200 of video bitstream processing. The method 1200 includes determining (1205) that a first portion of an image exceeds beyond a border of a second portion of the image, and performing (1210) a partitioning of the first portion of the image based on the determination that the first portion exceeds beyond the border. In some embodiments, the operation 1210 includes performing EQT partitioning. In some embodiments, the operation 1210 is performing FT partitioning. In some embodiments, the operation 1210 includes performing GTT partitioning. In some embodiments, the operation 1210 may include performing EQT partitioning.

Figure 13:
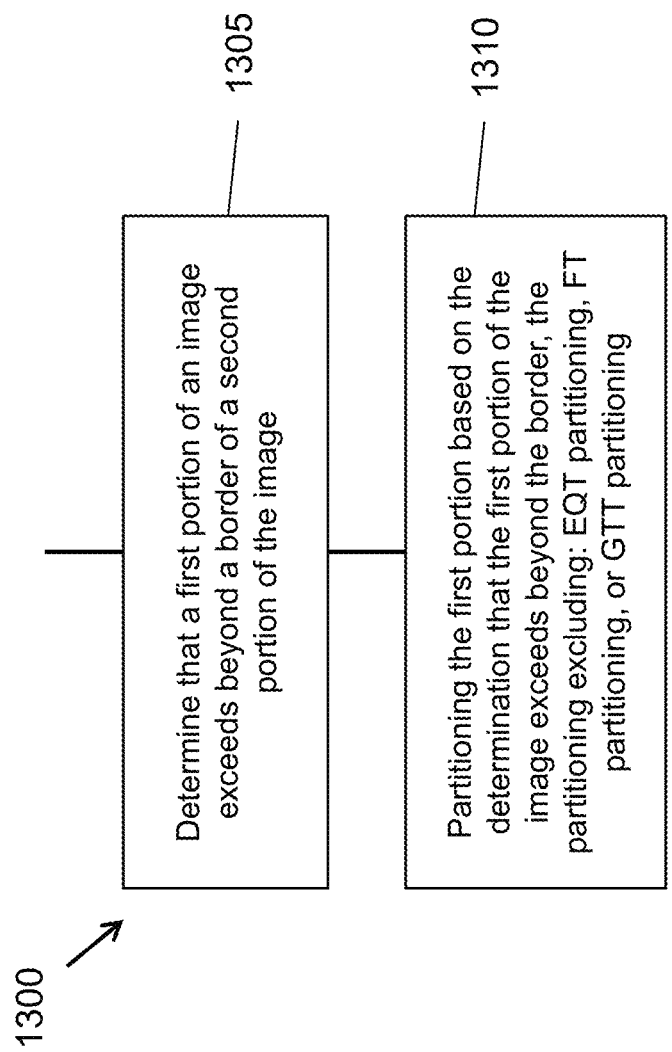
FIG. 13 is a flowchart for an example of a video bitstream processing method.

FIG. 13 is a flowchart for a method 1300 of video bitstream processing. The method 1300 includes determining (1305) that a first portion of an image exceeds beyond a border of a second portion of the image, and partitioning (1310) the first portion based on the determination that the first portion of the image exceeds beyond the border, the partitioning excluding: EQT partitioning, FT partitioning, and GTT partitioning.

Figure 14:
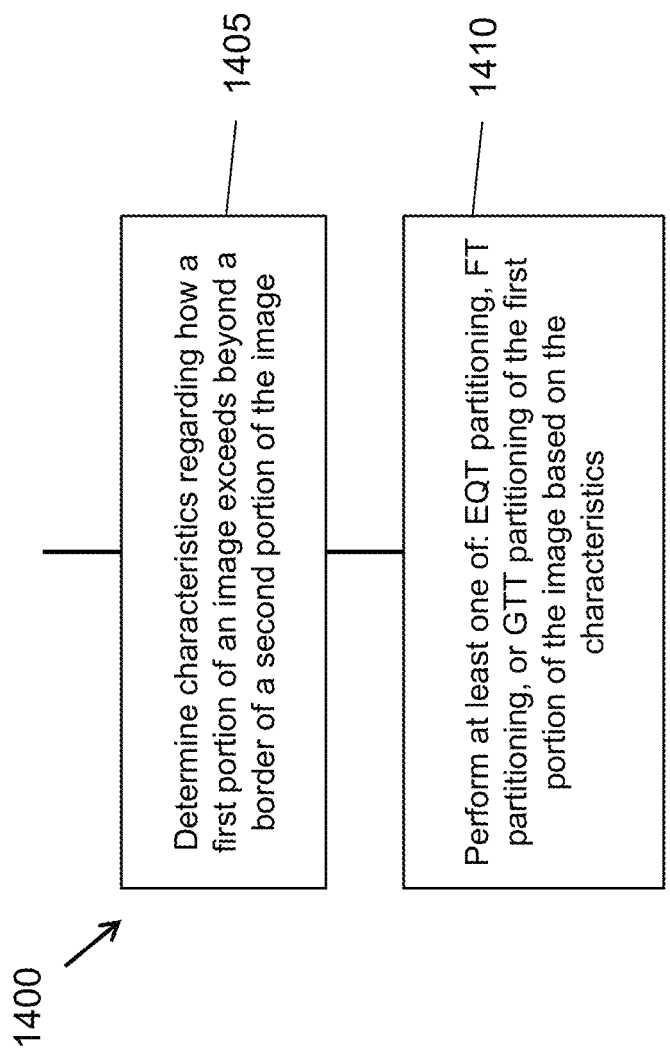
FIG. 14 is a flowchart for an example of a video bitstream processing method.

FIG. 14 is a flowchart for a method 1400 of video bitstream processing. The method 1400 includes determining (1405) characteristics regarding how a first portion of an image exceeds beyond a border of a second portion of the image, and performing (1410) partitioning of the first portion of the image based on the characteristics. In some embodiments, the partitioning includes EQT partitioning. In some embodiments, the partitioning includes FT partitioning. In some embodiments, the partitioning includes GTT partitioning.

With reference to methods 1200, 1300, and 1400, some examples of partitioning and their use are described in Section 4 of the present document. For example, as described in Section 4, based on how a first portion of an image exceeds beyond a border of a second portion of the image, EQT partitioning, FT partitioning, or GTT partitioning may or may not be performed.

With reference to methods 1200, 1300, and 1400, a first portion may be encoded in the video bitstream in which bit efficiency may be achieved by using a bitstream generation rule related to how the first portion exceeds beyond a border of a second portion of the image.

The methods can include determining, by the processor, that a third portion of the image is adjacent to the border; and partitioning, by the processor, the third portion of the image using another partitioning technique to encode the third portion based on the determination that the third portion is adjacent to the border, the another partitioning technique excluding: EQT, FT, and GTT.

The methods can include wherein determining the characteristics regarding how the first portion of the image exceeds beyond the border includes: determining, by the processor, that a bottom-right portion of the first portion exceeds below a bottom border of the second portion and that the bottom-right portion does not exceed beyond a right border of the second portion, or that the bottom-right portion of the first portion is adjacent to and not exceeding beyond the right border of the second portion and that the bottom-right portion of the first portion does not exceed beyond the bottom border of the second portion.

The methods can include determining the characteristics regarding how the first portion of the image exceeds beyond the border includes: determining, by the processor, that a bottom-right portion of the first portion exceeds below a bottom border of the second portion and that the bottom-right portion does not exceed beyond a right border of the second portion.

The methods can include EQT is in accordance with forced boundary partitioning (FBP).

The methods can include wherein the first portion has a width M and a height N, and wherein FBP includes partitioning the first portion into sub-portions each having a width of M, and the sub-portions each having a height of N/4.

The methods can include wherein the first portion has a width M and a height N, and wherein FBP includes partitioning the first portion into sub-portions each having a width of M/4, and the sub-portions each having a height of N.

The methods can include wherein the first portion has a width M and a height N, and wherein FBP includes partitioning the first portion into a first sub-portion and a second sub-portion each having a width of M/2, the first sub-portion having a height of N/4, and the second sub-portion having a height of 3N/4, the first sub-portion being positioned above the second sub-portion.

The methods can include wherein the first portion has a width M and a height N, and wherein FBP includes partitioning the first portion into a first sub-portion and a second sub-portion each having a height of N/2, the first sub-portion having a width of M/4, the second sub-portion having a width of 3M/4, the first sub-portion positioned to the left of the second sub-portion.

The methods can include wherein the first portion has a width M and a height N, and wherein FBP includes partitioning the first portion into a first sub-portion and a second sub-portion each having a width of M/2, the first sub-portion having a height of 3N/4, the second sub-portion having a height of N/4, the second sub-portion positioned below the first sub-portion.

The methods can include wherein the first portion has a width M and a height N, and wherein FBP includes partitioning the first portion into a first sub-portion and a second sub-portion each having a height of N/2, the first sub-portion having a weight of 3M/4, the second sub-portion having a width of M/4, the second sub-portion positioned to the right of the first sub-portion.

The methods can include wherein the first portion has a width M and a height N, and wherein FBP includes partitioning the first portion into a first sub-portion and a second sub-portion, the first sub-portion having a dimension of M width and N/4 height, and the second sub-portion having a dimension of M/2 width and N/2 height.

The methods can include wherein the first portion has a width M and a height N, and wherein FBP includes partitioning the first portion into a first sub-portion and a second sub-portion, the first sub-portion having a dimension of N width and M/4 height, the second sub-portion having a dimension of N/2 width and M/2 height.

The methods can include wherein the first portion has a width M and a height N, a dimension M1 being less than M, a dimension N1 being less than N, and wherein FBP includes partitioning the first portion into a first sub-portion having M1 width and N1 height, a second sub-portion having M−M1 width and N1 height, a third sub-portion having M1 width and N−N1 height, and a fourth sub-portion M−M1 width and N−N1 height.

The methods can include wherein the first portion has a width M and a height N and wherein FBP includes partitioning the first portion into a first portion having a width M and a height N1, a second portion having a width M and a height N2, a third portion having a width M and a height N3, and a fourth portion having a width M and a height N4, wherein N1+N2+N3+N4=N.

The methods can include wherein the first portion has a width M and a height N and wherein FBP includes partitioning the first portion into a first portion having a width M1 and a height N, a second portion having a width M2 and a height N, a third portion having a width M3 and a height N, and a fourth portion having a width M4 and a height N, wherein M1+M2+M3+M4=M.

The methods can include wherein FT is in accordance with forced boundary partitioning (FBP).

The methods can include wherein the first portion has a width M and a height N and wherein FBP includes partitioning the first portion into 8 sub-portions, each of the 8 sub-portions having a width M/4 and a height N/2.

The methods can include wherein the first portion has a width M and a height N and wherein FBP includes partitioning the first portion into 8 sub-portions, each of the 8 sub-portions having a width M/2 and a height N/4.

The methods can include wherein the first portion has a width M and a height N and wherein FBP includes partitioning the first portion into 6 sub-portions, a first subset of the sub-portions having a width M/2 and a height N/2, and a second subset of the sub-portions having a width M/4 and a height N/2.

The methods can include wherein the first portion has a width M and a height N and wherein FBP includes partitioning the first portion into 6 sub-portions, a first subset of the sub-portions having a width M/2 and a height N/2, and a second subset of the sub-portions having a width M/2 and a height N/4.

The methods can include wherein GT is in accordance with forced boundary partitioning (FBP).

The methods can include wherein FBP includes partitioning the first portion into sub-portions without restrictions on horizontal or vertical splitting.

The methods can include wherein EQT is performed based on the characteristics, and EQT is in accordance with forced boundary partitioning (FBP).

The methods can include determining the characteristics regarding how the first portion of the image exceeds beyond the border includes: determining, by the processor, that a bottom-right portion of the first portion exceeds below a bottom border of the second portion and that the bottom-right portion does not exceed beyond a right border of the second portion, wherein the first portion has a width M and a height N, and wherein FBP includes partitioning the first portion into sub-portions each having a width M and a height N/4, into sub-portions having a width M and a height N/4 and sub-portions having a width M/2 and a height N/2, or into sub-portions including a first sub-portion having a width M and height N1, a second-sub-portion having a width M and a height N2, a third sub-portion having a width M and a height N3, and a fourth sub-portion having a width M and a height N4, wherein N1+N2+N3+N4=N.

The methods can include determining the characteristics regarding how the first portion of the image exceeds beyond the border includes: determining, by the processor, that a bottom-right portion of the first portion does not exceed below a bottom border of the second portion and that the bottom-right portion is adjacent to a right border of the second portion, wherein the first portion has a width M and a height N, and wherein FBP includes partitioning the first portion into sub-portions each having a width of M/4, and the sub-portions each having a height of N, into a first sub-portion and a second sub-portion, the first sub-portion having a dimension of N width and M/4 height, the second sub-portion having a dimension of N/2 width and M/2 height, or into a first portion having a width M1 and a height N, a second portion having a width M2 and a height N, a third portion having a width M3 and a height N, and a fourth portion having a width M4 and a height N, wherein M1+M2+M3+M4=M.

The methods can include determining the characteristics regarding how the first portion of the image exceeds beyond the border includes: determining, by the processor, that a bottom-right portion of the first portion does not exceed below a bottom border of the second portion and that the bottom-right portion is adjacent to a right border of the second portion, wherein the first portion has a width M and a height N, and wherein FBP includes partitioning the first portion into a first sub-portion and a second sub-portions each having a width of M/2, the first sub-portion having a height of N/4, and the second sub-portion having a height of 3N/4, the first sub-portion being positioned above the second sub-portion, or into a first sub-portion and a second sub-portion each having a height of N/2, the first sub-portion having a width of M/4, the second sub-portion having a width of 3M/4, the first sub-portion positioned to the left of the second sub-portion, or into a first sub-portion and a second sub-portion each having a width of M/2, the first sub-portion having a height of 3N/4, the second sub-portion having a height of N/4, the second sub-portion positioned below the first sub-portion, or a first sub-portion and a second sub-portion each having a height of N/2, the first sub-portion having a weight of 3M/4, the second sub-portion having a width of M/4, the second sub-portion positioned to the right of the first sub-portion, or into a first sub-portion having M1 width and N1 height, a second sub-portion having M−M1 width and N1 height, a third sub-portion having M1 width and N−N1 height, and a fourth sub-portion M−M1 width and N−N1 height.

The methods can include wherein EQT is performed based on the characteristics, and EQT is in accordance with forced boundary partitioning (FBP).

The methods can include determining the characteristics regarding how the first portion of the image exceeds beyond the border includes: determining, by the processor, that a bottom-right portion of the first portion exceeds below a bottom border of the second portion and that the bottom-right portion does not exceed beyond a right border of the second portion, wherein the first portion has a width M and a height N, and wherein FBP includes partitioning the first portion into 8 sub-portions, each of the 8 sub-portions having a width M/2 and a height N/4, or into 6 sub-portions, a first subset of the sub-portions having a width M/2 and a height N/2, and a second subset of the sub-portions having a width M/2 and a height N/4.

The methods can include determining the characteristics regarding how the first portion of the image exceeds beyond the border includes: determining, by the processor, that a bottom-right portion of the first portion does not exceed below a bottom border of the second portion and that the bottom-right portion is adjacent to a right border of the second portion, wherein the first portion has a width M and a height N, and wherein FBP includes partitioning the first portion into 8 sub-portions, each of the 8 sub-portions having a width M/4 and a height N/2, or into 6 sub-portions, a first subset of the sub-portions having a width M/2 and a height N/2, and a second subset of the sub-portions having a width M/4 and a height N/2.

The methods can include wherein GTT is performed based on the characteristics, and GTT is in accordance with forced boundary partitioning (FBP).

The methods can include wherein determining the characteristics regarding how the first portion of the image exceeds beyond the border includes: determining, by the processor, that a bottom-right portion of the first portion exceeds below a bottom border of the second portion and that the bottom-right portion does not exceed beyond a right border of the second portion, wherein FBP includes partitioning the first portion into sub-portions without restrictions on horizontal or vertical splitting.

Figure 15:
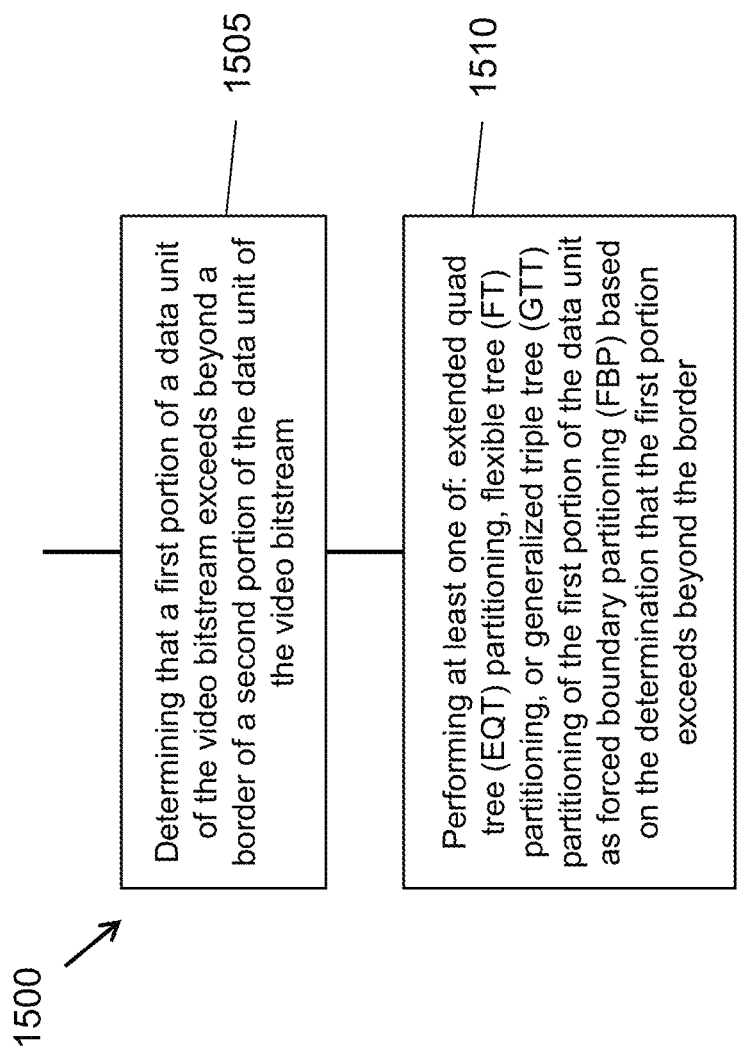
FIG. 15 is a flowchart for an example of a video bitstream processing method.

FIG. 15 is a flowchart for a method 1500 of video bitstream processing. The method 1500 includes determining (1505) that a first portion of a data unit of the video bitstream exceeds beyond a border of a second portion of the data unit of the video bitstream, and performing (1510) performing at least one of: extended quad tree (EQT) partitioning, flexible tree (FT) partitioning, or generalized triple tree (GTT) partitioning of the first portion of the data unit as forced boundary partitioning (FBP) based on the determination that the first portion exceeds beyond the border.

In some embodiments, the data unit is an image, a slice or a tile.

In some embodiments, the second portion of the data unit is the whole data unit.

In some embodiments, the first portion is a Coding Tree Unit (CTU) or a Coding Unit (CU).

In some embodiments, EQT is in accordance with forced boundary partitioning (FBP).

In some embodiments, the first portion has a width M and a height N, and wherein FBP includes partitioning the first portion into four sub-portions each having a width of M, and the sub-portions each having a height of N/4.

In some embodiments, the first portion has a width M and a height N, and wherein FBP includes partitioning the first portion into four sub-portions each having a width of M/4, and the sub-portions each having a height of N.

In some embodiments, the first portion has a width M and a height N, and wherein FBP includes partitioning the first portion into four sub-portions, wherein at least one sub-portion has different dimension with other sub-portions.

In some embodiments, the first portion has a width M and a height N, and wherein FBP includes partitioning the first portion into two first sub-portions and two second sub-portions each having a width of M/2, the first sub-portion having a height of N/4, and the second sub-portion having a height of 3N/4, the first sub-portion being positioned above the second sub-portion.

In some embodiments, the first portion has a width M and a height N, and wherein FBP includes partitioning the first portion into two first sub-portions and two second sub-portions each having a height of N/2, the first sub-portion having a width of M/4, the second sub-portion having a width of 3M/4, the first sub-portion positioned to the left of the second sub-portion.

In some embodiments, the first portion has a width M and a height N, and wherein FBP includes partitioning the first portion into two first sub-portions and two second sub-portions each having a width of M/2, the first sub-portion having a height of 3N/4, the second sub-portion having a height of N/4, the second sub-portion positioned below the first sub-portion.

In some embodiments, the first portion has a width M and a height N, and wherein FBP includes partitioning the first portion into two first sub-portions and two second sub-portions each having a height of N/2, the first sub-portion having a weight of 3M/4, the second sub-portion having a width of M/4, the second sub-portion positioned to the right of the first sub-portion.

In some embodiments, the first portion has a width M and a height N, and wherein FBP includes partitioning the first portion into two first sub-portion and two second sub-portion, the first sub-portion having a dimension of M width and N/4 height, and the second sub-portion having a dimension of M/2 width and N/2 height.

In some embodiments, the first portion has a width M and a height N, and wherein FBP includes partitioning the first portion into two first sub-portion and two second sub-portion, the first sub-portion having a dimension of N height and M/4 width, the second sub-portion having a dimension of N/2 height and M/2 width.

In some embodiments, the first portion has a width M and a height N, a dimension M1 being less than M, a dimension N1 being less than N, and wherein FBP includes partitioning the first portion into a first sub-portion having M1 width and N1 height, a second sub-portion having M−M1 width and N1 height, a third sub-portion having M1 width and N−N1 height, and a fourth sub-portion M−M1 width and N−N1 height.

In some embodiments, the first portion has a width M and a height N and wherein FBP includes partitioning the first portion into a first portion having a width M and a height N1, a second portion having a width M and a height N2, a third portion having a width M and a height N3, and a fourth portion having a width M and a height N4, wherein N1+N2+N3+N4=N.

In some embodiments, the first portion has a width M and a height N and wherein FBP includes partitioning the first portion into a first portion having a width M1 and a height N, a second portion having a width M2 and a height N, a third portion having a width M3 and a height N, and a fourth portion having a width M4 and a height N, wherein M1+M2+M3+M4=M.

In some embodiments, the FT is in accordance with forced boundary partitioning (FBP).

In some embodiments, the first portion has a width M and a height N and wherein FBP includes partitioning the first portion into more than 4 sub-portions.

In some embodiments, the first portion has a width M and a height N and wherein FBP includes partitioning the first portion into 8 sub-portions, each of the 8 sub-portions having a width M/4 and a height N/2.

In some embodiments, the first portion has a width M and a height N and wherein FBP includes partitioning the first portion into 8 sub-portions, each of the 8 sub-portions having a width M/2 and a height N/4.

In some embodiments, the first portion has a width M and a height N and wherein FBP includes partitioning the first portion into 6 sub-portions, a first subset of the sub-portions having a width M/2 and a height N/2, and a second subset of the sub-portions having a width M/4 and a height N/2.

In some embodiments, the first portion has a width M and a height N and wherein FBP includes partitioning the first portion into 6 sub-portions, a first subset of the sub-portions having a width M/2 and a height N/2, and a second subset of the sub-portions having a width M/2 and a height N/4.

In some embodiments, GTT is in accordance with forced boundary partitioning (FBP).

In some embodiments, FBP includes partitioning the first portion into sub-portions without restrictions on horizontal or vertical splitting.

In some embodiments, the first portion has a width M and a height N and wherein FBP includes partitioning the first portion into 3 sub-portions, a first sub-portions having a width M/4 and a height N, and two second sub-portions each having a width M3/4 and a height N/2.

In some embodiments, the first portion has a width M and a height N and wherein FBP includes partitioning the first portion into 3 sub-portions, a first sub-portions having a width M and a height N/4, and two second sub-portions each having a width M/2 and a height N3/4.

In some embodiments, determining that a first portion of a data unit of the video bitstream exceeds beyond a border of a second portion of the data unit of the video bitstream comprising:

determining characteristics regarding how the first portion of the data unit of the video bitstream exceeds beyond the border of the second portion of the data unit of the video bitstream.

In some embodiments, performing EQT is based on the characteristics, and EQT is in accordance with forced boundary partitioning (FBP).

In some embodiments, determining characteristics regarding how the first portion of the data unit of the video bitstream exceeds beyond the border of the second portion of the data unit of the video bitstream includes: determining that a bottom-right portion of the first portion exceeds below a bottom border of the second portion and that the bottom-right portion does not exceed beyond a right border of the second portion, wherein the first portion has a width M and a height N, and wherein FBP includes partitioning the first portion into four sub-portions each having a width M and a height N/4, into two sub-portions having a width M and a height N/4 and two sub-portions having a width M/2 and a height N/2, or into sub-portions including a first sub-portion having a width M and height N1, a second-sub-portion having a width M and a height N2, a third sub-portion having a width M and a height N3, and a fourth sub-portion having a width M and a height N4, wherein N1+N2+N3+N4=N.

In some embodiments, determining characteristics regarding how the first portion of the data unit of the video bitstream exceeds beyond the border of the second portion of the data unit of the video bitstream includes: determining that a bottom-right portion of the first portion does not exceed below a bottom border of the second portion and that the bottom-right portion exceeds beyond a right border of the second portion, wherein the first portion has a width M and a height N, and wherein FBP includes partitioning the first portion into four sub-portions each having a width of M/4 and a height of N, into two first sub-portions and two second sub-portions, the first sub-portion having a dimension of N width and M/4 height, the second sub-portion having a dimension of N/2 width and M/2 height, or into a first portion having a width M1 and a height N, a second portion having a width M2 and a height N, a third portion having a width M3 and a height N, and a fourth portion having a width M4 and a height N, wherein M1+M2+M3+M4=M.

In some embodiments, determining characteristics regarding how the first portion of the data unit of the video bitstream exceeds beyond the border of the second portion of the data unit of the video bitstream includes: determining that a bottom-right portion of the first portion exceeds below a bottom border of the second portion and that the bottom-right portion exceeds beyond a right border of the second portion, wherein the first portion has a width M and a height N, and wherein FBP includes partitioning the first portion into two first sub-portions and two second sub-portions each having a width of M/2, the first sub-portion having a height of N/4, and the second sub-portion having a height of 3N/4, the first sub-portion being positioned above the second sub-portion, or into two first sub-portions and two second sub-portions each having a height of N/2, the first sub-portion having a width of M/4, the second sub-portion having a width of 3M/4, the first sub-portion positioned to the left of the second sub-portion, or into two first sub-portions and two second sub-portions each having a width of M/2, the first sub-portion having a height of 3N/4, the second sub-portion having a height of N/4, the second sub-portion positioned below the first sub-portion, or two first sub-portions and two second sub-portions each having a height of N/2, the first sub-portion having a weight of 3M/4, the second sub-portion having a width of M/4, the second sub-portion positioned to the right of the first sub-portion, or into a first sub-portion having M1 width and N1 height, a second sub-portion having M−M1 width and N1 height, a third sub-portion having M1 width and N−N1 height, and a fourth sub-portion M−M1 width and N−N1 height.

In some embodiments, FT is performed based on the characteristics, and FT is in accordance with forced boundary partitioning (FBP).

In some embodiments, determining characteristics regarding how the first portion of the data unit of the video bitstream exceeds beyond the border of the second portion of the data unit of the video bitstream includes: determining that a bottom-right portion of the first portion exceeds below a bottom border of the second portion and that the bottom-right portion does not exceed beyond a right border of the second portion, wherein the first portion has a width M and a height N, and wherein FBP includes partitioning the first portion into 8 sub-portions, each of the 8 sub-portions having a width M/2 and a height N/4, or into 6 sub-portions, a first subset of the sub-portions having a width M/2 and a height N/2, and a second subset of the sub-portions having a width M/2 and a height N/4.

In some embodiments, determining characteristics regarding how the first portion of the data unit of the video bitstream exceeds beyond the border of the second portion of the data unit of the video bitstream includes: determining that a bottom-right portion of the first portion does not exceed below a bottom border of the second portion and that the bottom-right portion exceeds beyond a right border of the second portion, wherein the first portion has a width M and a height N, and wherein FBP includes partitioning the first portion into 8 sub-portions, each of the 8 sub-portions having a width M/4 and a height N/2, or into 6 sub-portions, a first subset of the sub-portions having a width M/2 and a height N/2, and a second subset of the sub-portions having a width M/4 and a height N/2.

In some embodiments, GTT is performed based on the characteristics, and GTT is in accordance with forced boundary partitioning (FBP).

In some embodiments, determining characteristics regarding how the first portion of the data unit of the video bitstream exceeds beyond the border of the second portion of the data unit of the video bitstream includes: determining that a bottom-right portion of the first portion exceeds below a bottom border of the second portion and that the bottom-right portion does not exceed beyond a right border of the second portion, wherein FBP includes partitioning the first portion into sub-portions without restrictions on horizontal or vertical splitting.

In some embodiments, the first portion has a width M and a height N and wherein FBP includes partitioning the first portion into 3 sub-portions, a first sub-portions having a width M and a height N/4, and two second sub-portions each having a width M/2 and a height N3/4.

In some embodiments, determining characteristics regarding how the first portion of the data unit of the video bitstream exceeds beyond the border of the second portion of the data unit of the video bitstream includes: determining that a bottom-right portion of the first portion does not exceed below a bottom border of the second portion and that the bottom-right portion exceeds beyond a right border of the second portion, wherein FBP includes partitioning the first portion into sub-portions without restrictions on horizontal or vertical splitting.

In some embodiments, the first portion has a width M and a height N and wherein FBP includes partitioning the first portion into 3 sub-portions, a first sub-portions having a width M/4 and a height N, and two second sub-portions each having a width M3/4 and a height N/2.

Figure 16:
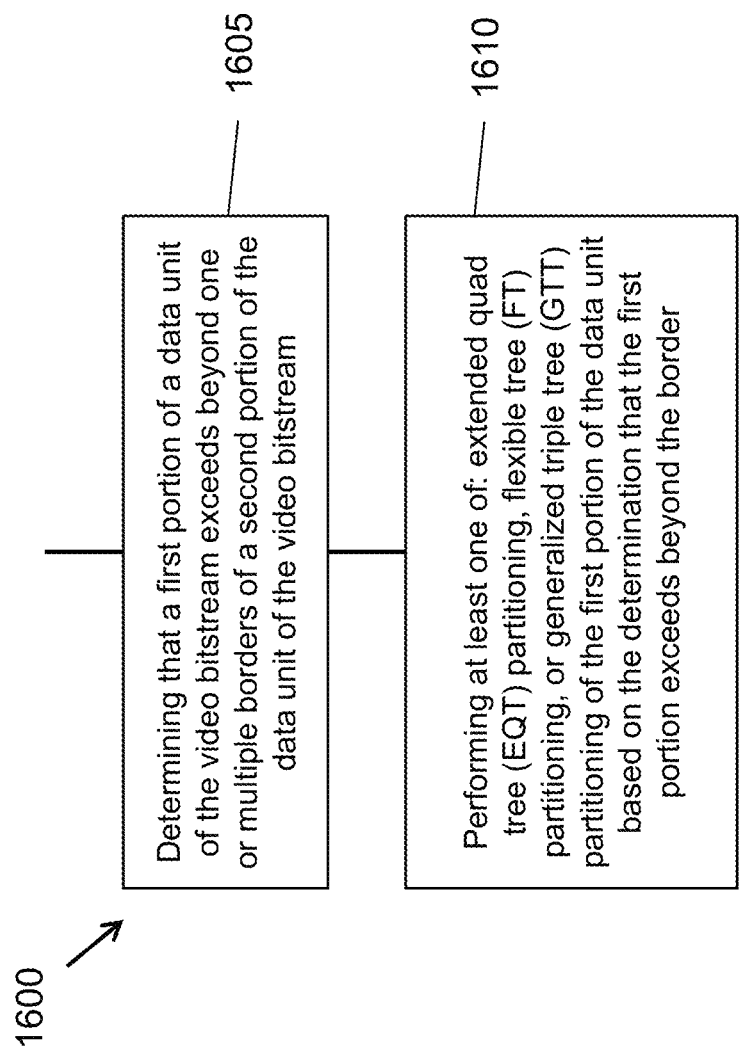
FIG. 16 is a flowchart for an example of a video bitstream processing method.

FIG. 16 is a flowchart for a method 1600 of video bitstream processing. The method 1600 includes determining (1605) that that a first portion of a data unit of the video bitstream exceeds beyond one or multiple borders of a second portion of the data unit of the video bitstream; and performing (1610) performing at least one of: extended quad tree (EQT) partitioning, flexible tree (FT) partitioning, or generalized triple tree (GTT) partitioning of the first portion of the data unit based on the determination that the first portion exceeds beyond the border.

In some embodiments, the data unit is an image, a slice or a tile.

In some embodiments, the second portion of the data unit is the whole data unit.

In some embodiments, the first portion is a Coding Tree Unit (CTU) or a Coding Unit (CU).

In some embodiments, the method further comprises: signaling indication of usage of EQT, FT, or GTT with the same process in response to determination that the first portion exceeds beyond the border.

In some embodiments, the method further comprising: skipping signaling indications of usage of at least one of EQT, FT, or GTT in response to determination that the first portion is located at borders.

Figure 17:
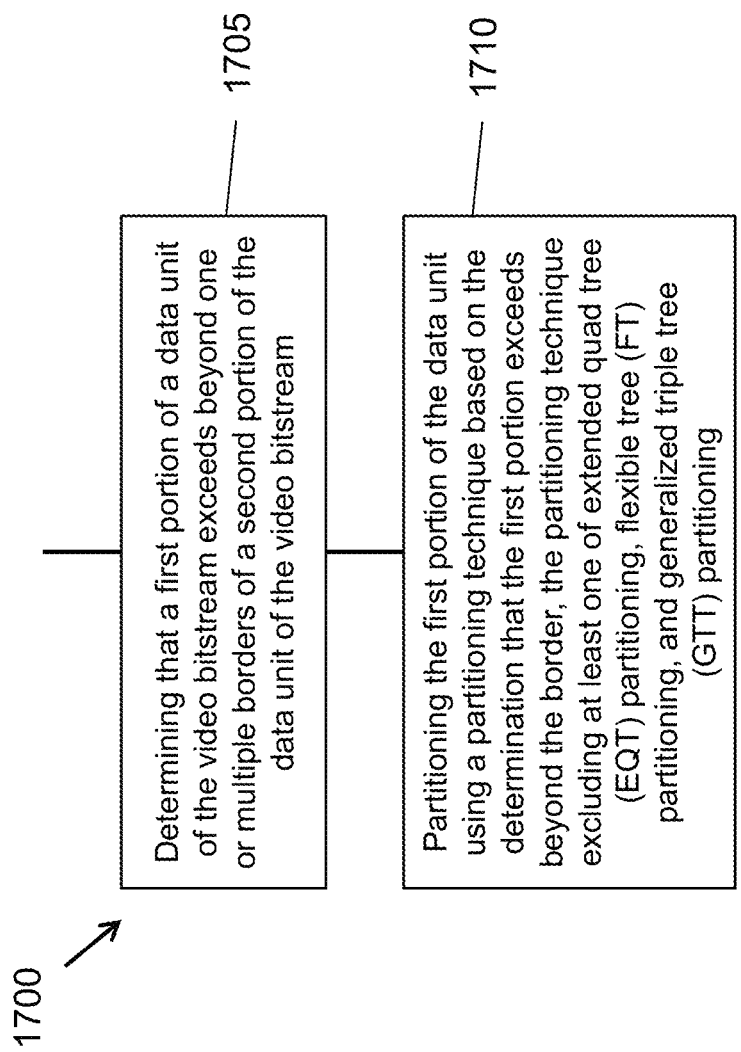
FIG. 17 is a flowchart for an example of a video bitstream processing method.

FIG. 17 is a flowchart for a method 1700 of video bitstream processing. The method 1700 includes determining (1705) that a first portion of a data unit of the video bitstream exceeds beyond one or multiple borders of a second portion of the data unit of the video bitstream; and partitioning (1710) the first portion of the data unit using a partitioning technique based on the determination that the first portion exceeds beyond the border, the partitioning technique excluding at least one of extended quad tree (EQT) partitioning, flexible tree (FT) partitioning, and generalized triple tree (GTT) partitioning.

In some embodiments, the data unit is an image, a slice or a tile.

In some embodiments, the second portion of the data unit is the whole data unit.

In some embodiments, the first portion is a Coding Tree Unit (CTU) or a Coding Unit (CU).

In some embodiments, the method further comprises: signaling indication of usage of EQT, FT, or GTT with the same process in response to determination that the first portion exceeds beyond the border.

In some embodiments, the method further comprising: skipping signaling indications of usage of at least one of EQT, FT, or GTT in response to determination that the first portion is located at borders.

Figure 18:
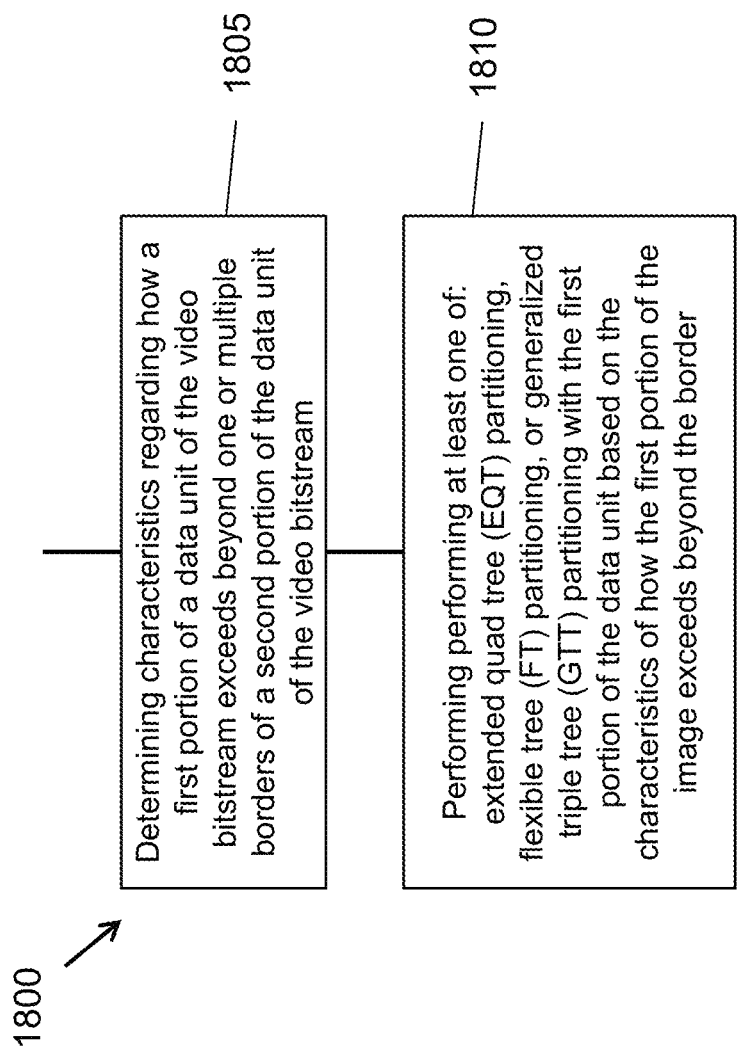
FIG. 18 is a flowchart for an example of a video bitstream processing method.

FIG. 18 is a flowchart for a method 1800 of video bitstream processing. The method 1800 includes determining (1805) that characteristics regarding how a first portion of a data unit of the video bitstream exceeds beyond one or multiple borders of a second portion of the data unit of the video bitstream; and performing (1810) at least one of: extended quad tree (EQT) partitioning, flexible tree (FT) partitioning, or generalized triple tree (GTT) partitioning with the first portion of the data unit based on the characteristics of how the first portion of the image exceeds beyond the border.

In some embodiments, the data unit is an image, a slice or a tile.

In some embodiments, the second portion of the data unit is the whole data unit.

In some embodiments, the first portion is a Coding Tree Unit (CTU) or a Coding Unit (CU).

In some embodiments, the method further comprising: determining whether to signal indication of usage of EQT, FT, or GTT depending on the characteristics regarding how the first portion of the data unit exceeds beyond the border.

In some embodiments, signaling indication of usage of at least one of EQT, FT, or GTT in response to determination that a bottom-right portion of the first portion exceeds below a bottom border of the second portion and that the bottom-right portion does not exceed beyond a right border of the second portion.

In some embodiments, signaling indication of usage of at least one of EQT, FT, or GTT in response to determination that a bottom-right portion of the first portion exceeds beyond a right border of the second portion and that the bottom-right portion does not exceed below a bottom border of the second portion.

In some embodiments, skipping signaling indication of usage of at least one of EQT, FT, or GTT in response to determining that a bottom-right portion of the first portion exceeds below a bottom border of the second portion and that the bottom-right portion exceed beyond a right border of the second portion.

In some embodiments, EQT partitioning represents block of the data unit is split equally or unequally into four sub-blocks.

In some embodiments, FT partitioning represents block of the data unit is split equally or unequally into K sub-units, K is larger than 4.

In some embodiments, GTT partitioning represents block of the data unit is split into three sub-units without restrictions for both horizontal and vertical split directions.

It will be appreciated that the disclosed techniques may be embodied in video encoders or decoders to improve compression efficiency when the coding units being compressed have shaped that are significantly different than the traditional square shaped blocks or rectangular blocks that are half-square shaped. For example, new coding tools that use long or tall coding units such as 4×32 or 32×4 sized units may benefit from the disclosed techniques.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of coding video data, comprising:
determining, for a conversion between a current video block of a data unit in a video and a bitstream of the video, that the current video block exceeds beyond at least one border of the data unit;
partitioning, in response to the determining that the current video block exceeds beyond at least one border of the data unit, the current video block without using an extended quad tree (EQT); and
wherein whether an indication of usage of the EQT is included in the bitstream depends on whether the current video block exceeds beyond at least one border of the data unit;
wherein signaling the indication of usage of the EQT is skipped in response to the determination that the current video block exceeds beyond at least one border of the data unit,
wherein a block is split unequally into four sub-blocks in response to partitioning the block using the EQT,
wherein a first sub-block and a second sub-block of the four sub-blocks have a first dimension, a third sub-block and a fourth sub-block of the four sub-blocks have a second dimension, and wherein a height (H) and a width (W) of the block are integers, the first dimension and the second dimension have one of two cases:

23

(i) the first dimension is H/4×W, and the second dimension is H/2×W/2, or
(ii) the first dimension is H×W/4, and the second dimension is H/2×W/2.

2. The method of claim 1, wherein the data unit is a picture.

3. The method of claim 1, wherein the current video block is a Coding Tree Unit (CTU).

4. The method of claim 1, further comprising:
skip signaling the indication of usage of the EQT in response to a determination that a bottom-right portion of the current video block exceeds below a bottom border of the data unit and the bottom-right portion of the current video block exceed beyond a right border of the data unit.

5. The method of claim 1, wherein the conversion includes encoding the current video block into the bitstream.

6. The method of claim 1, wherein the conversion includes decoding the current video block from the bitstream.

7. An apparatus for processing video data comprising a processor and a non-transitory memory with instructions thereon, wherein the instructions upon execution by the processor, cause the processor to:
determine, for a conversion between a current video block of a data unit in a video and a bitstream of the video, that the current video block exceeds beyond at least one border of the data unit;
partition, in response to the determining that the current video block exceeds beyond at least one border of the data unit, the current video block without using an extended quad tree (EQT); and
wherein whether an indication of usage of the EQT is included in the bitstream depends on whether the current video block exceeds beyond at least one border of the data unit;
wherein signaling the indication of usage of the EQT is skipped in response to the determination that the current video block exceeds beyond at least one border of the data unit,
wherein a block is split unequally into four sub-blocks in response to partitioning the block using the EQT,
wherein a first sub-block and a second sub-block of the four sub-blocks have a first dimension, a third sub-block and a fourth sub-block of the four sub-blocks have a second dimension, and wherein a height (H) and a width (W) of the block are integers, the first dimension and the second dimension have two cases:
(i) the first dimension is H/4×W, and the second dimension is H/2×W/2, or
(ii) the first dimension is H×W/4, and the second dimension is H/2×W/2.

8. The apparatus of claim 7, wherein the data unit is a picture.

9. The apparatus of claim 7, wherein the current video block is a Coding Tree Unit (CTU).

10. The apparatus of claim 7, further comprising:
skip signaling the indication of usage of the EQT in response to a determination that a bottom-right portion of the current video block exceeds below a bottom border of the data unit and the bottom-right portion of the current video block exceed beyond a right border of the data unit.

11. The apparatus of claim 7, wherein the conversion includes encoding the current video block into the bitstream.

24

12. The apparatus of claim 7, wherein the conversion includes decoding the current video block from the bitstream.

13. A non-transitory computer-readable storage medium storing instructions that cause a processor to:
determine, for a conversion between a current video block of a data unit in a video and a bitstream of the video, that the current video block exceeds beyond at least one border of the data unit;
partition, in response to the determining that the current video block exceeds beyond at least one border of the data unit, the current video block without using an extended quad tree (EQT); and
wherein whether an indication of usage of the EQT is included in the bitstream depends on whether the current video block exceeds beyond at least one border of the data unit;
wherein signaling the indication of usage of the EQT is skipped in response to the determination that the current video block exceeds beyond at least one border of the data unit,
wherein a block is split unequally into four sub-blocks in response to partitioning the block using the EQT,
wherein a first sub-block and a second sub-block of the four sub-blocks have a first dimension, a third sub-block and a fourth sub-block of the four sub-blocks have a second dimension, and wherein a height (H) and a width (W) of the block are integers, the first dimension and the second dimension have two cases:
(i) the first dimension is H/4×W, and the second dimension is H/2×W/2, or
(ii) the first dimension is H×W/4, and the second dimension is H/2×W/2.

14. A non-transitory computer-readable recording medium storing a bitstream which is generated by a method performed by a video processing apparatus, wherein the method comprises:
determining, for a conversion between a current video block of a data unit in a video and a bitstream of the video, that the current video block exceeds beyond at least one border of the data unit;
partitioning, in response to the determining that the current video block exceeds beyond at least one border of the data unit, the current video block without using an extended quad tree (EQT);
wherein whether an indication of usage of the EQT is included in the bitstream depends on whether the current video block exceeds beyond at least one border of the data unit;
wherein signaling the indication of usage of the EQT is skipped in response to the determination that the current video block exceeds beyond at least one border of the data unit; and
generating the bitstream from the current video block based on the determining and the partitioning,
wherein a block is split unequally into four sub-blocks in response to partitioning the block using the EQT,
wherein a first sub-block and a second sub-block of the four sub-blocks have a first dimension, a third sub-block and a fourth sub-block of the four sub-blocks have a second dimension, and wherein a height (H) and a width (W) of the block are integers, the first dimension and the second dimension have two cases:
(i) the first dimension is H/4×W, and the second dimension is H/2×W/2, or (ii) the first dimension is H×W/4, and the second dimension is H/2×W/2.

* * * * *